(12) United States Patent
Fredriksen et al.

(10) Patent No.: US 8,402,180 B2
(45) Date of Patent: Mar. 19, 2013

(54) AUTONOMOUS MULTI-PACKET TRANSFER FOR UNIVERSAL SERIAL BUS

(75) Inventors: Einar Fredriksen, Trondheim (NO);
Morten Werner Lund, Flatåsen (NO);
Vemund Kval Bakken, Elverum (NO)

(73) Assignee: Atmel Corporation, San Jose, CA (US)

( * ) Notice: Subject to any disclaimer, the term of this patent is extended or adjusted under 35 U.S.C. 154(b) by 19 days.

(21) Appl. No.: 12/748,311

(22) Filed: Mar. 26, 2010

(65) Prior Publication Data
US 2011/0238869 A1    Sep. 29, 2011

(51) Int. Cl.
*G06F 3/00*      (2006.01)
*G06F 13/00*     (2006.01)
(52) U.S. Cl. .............................. 710/33; 710/5
(58) Field of Classification Search .................... None
See application file for complete search history.

(56) References Cited

U.S. PATENT DOCUMENTS

| | | | |
|---|---|---|---|
| 6,665,082 B1 * | 12/2003 | Takeoka et al. | 358/1.15 |
| 6,795,872 B2 * | 9/2004 | Page et al. | 710/8 |
| 6,842,797 B1 * | 1/2005 | Lawande | 710/35 |
| 7,359,405 B2 * | 4/2008 | Chan et al. | 370/474 |
| 7,590,765 B2 | 9/2009 | Nagao et al. | |
| 2005/0240689 A1 * | 10/2005 | Leaming | 710/52 |
| 2008/0320180 A1 * | 12/2008 | Manabe | 710/33 |

* cited by examiner

*Primary Examiner* — Idriss N Alrobaye
*Assistant Examiner* — Richard B Franklin
(74) *Attorney, Agent, or Firm* — Fish & Richardson P.C.

(57) ABSTRACT

A USB device can be configured for multi-packet data transfer to and from endpoints with minimal software intervention. Minimal software intervention allows a Central Processing Unit (CPU) of the USB device to handle other tasks, maximizing USB bus utilization.

20 Claims, 7 Drawing Sheets

AUTONOMOUS MULTI-PACKET TRANSFER FOR UNIVERSAL SERIAL BUS

TECHNICAL FIELD

This subject matter is generally related to data transfer over a Universal Serial Bus (USB).

BACKGROUND

USB applications often require a data transfer to or from an endpoint in a USB device that is larger than the maximum data packet size for the endpoint. Typically, this requires a multi-packet data transfer, which can cause a Central Processing Unit (CPU) in the USB device to process a large amount of overhead information upon transmission of each data packet. During the CPU processing, a USB host may issue a new request to the same endpoint, to which the USB device must reply with a "not-acknowledged (NAK) handshake" if the USB device is not ready to handle the new request. Returning the "NAK handshake" can reduce bus utilization, especially for full-speed "OUT" endpoints, as the data packet must be re-transmitted.

SUMMARY

A USB device can be configured for multi-packet data transfer to and from endpoints in the USB device with minimal software intervention by a CPU in the USB device. Minimal software intervention by the CPU allows the CPU to handle other tasks, maximizing USB bus utilization.

For IN endpoints, the CPU can provide the USB device with the amount of data to be transferred and a start address for the data to be transferred. Each time an IN token packet is received from a USB host, the USB device can send a maximum length data packet to the USB host if the remaining number of data bytes to be transferred is equal to or greater than a maximum data packet size. After each data packet has been transferred, the USB device can store a number of bytes transferred, and can update a toggle status for non-isochronous endpoints. If the remaining data to be sent is less than the maximum data packet size, the remaining data bytes can be sent, and the completion of the data transfer can be indicated after the last data packet has been sent. The USB device can optionally generate an interrupt when the last data packet has been sent. If the number of data bytes to be sent is an integral multiple of the maximum data packet size, the USB device can optionally send a zero-length data packet as the last data packet.

For OUT endpoints, the CPU can provide the USB device with a maximum amount of data that can be accepted and a start address for the received data. Each time an OUT token packet is received from the USB host, the data from the data packet following the OUT token packet and the number of bytes received can be stored. A toggle status can updated for non-isochronous endpoints. If the received data packet is less than the maximum data packet size, or the total number of data bytes received matches the maximum amount of data that can be accepted by the endpoint, completion of the transfer to the endpoint is indicated. For example, completion of the transfer can be indicated by the USB device optionally generating an interrupt when the last data packet has been received by the endpoint.

DETAILED DESCRIPTION

System Overview

Figure 1:
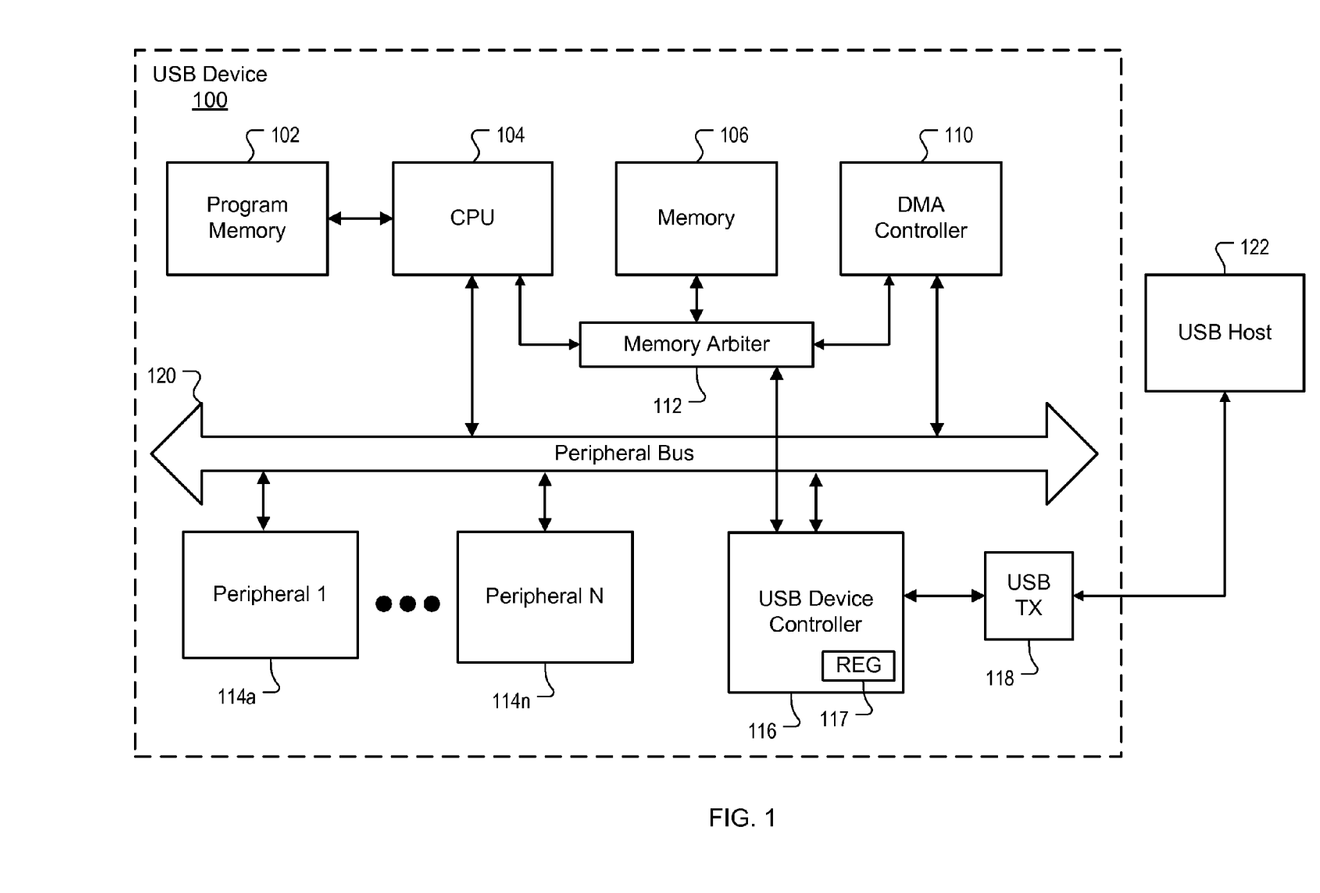
FIG. 1 is a schematic diagram of an exemplary USB device capable of performing autonomous multi-packet data transfer.

FIG. 1 is a schematic diagram of an exemplary USB device 100. In some implementations, device 100 can include program memory 102, Central Processing Unit (CPU) 104, memory 106 (e.g., RAM), Direct Memory Access (DMA) controller 110, memory arbiter 112, peripherals 114a-114n and USB device controller 116. Each of these components can communicate using peripheral bus 120. Controller 116 can include a register 117 for storing a number of bytes to be transferred as described in reference to FIGS. 2-6. Controller 116 can be coupled to USB host 122 through USB transceiver 118. In this example configuration, CPU 104 and DMA 110 are masters on bus 120 and peripherals 114a-114n are slaves on bus 120. DMA controller 110 is optional. Peripherals 114a-114b are internal units or IP cores of device 100, such as a Universal Asynchronous Receiver/Transmitter (UART) or a Serial Peripheral Interface (SPI). USB transceiver 118 is an electrical interface to bus 120. USB transceiver 118 can be internal or external to device 100. USB transceiver 118 can include a line driver. Register 117 may be a register located in controller 116 (as shown) or a location in memory 106.

Program memory 102 can store instructions that are executed by CPU 104 to perform various USB tasks. Memory can store data structures for facilitating USB transfers, such as endpoint buffers. Memory arbiter 112 can control or arbitrate requests to access memory 106 made by CPU 104, controller 116 or host 122. Controller 116 can perform various USB transactions initiated by host 122. USB transactions can be defined by USB protocol (e.g., USB 2.0 Specification).

Device 100 can be any USB compatible device. In the example shown, device 100 can be an integrated circuit (e.g., a microcontroller) that provides an interface or "hub" between host 122 and peripherals 114a-114n. Device 100 can communicate "upstream" with host 122 and "downstream" to peripherals 114a-114n. Some examples of peripherals can include printers, scanners, storage devices, modems, keyboards, musical instruments or any other USB compatible device. An example USB host is a personal computer (PC).

Device 100 can perform IN and OUT data transfers. An IN transfer is a data transfer from one or more endpoints in peripherals 114a-114n to host 122. An OUT transfer is a data transfer from host 122 to one or more endpoints in peripherals 114a-114n. An endpoint is a source or sink of data inside a peripheral, such as an addressable First-In-First-Out (FIFO) buffer. Peripherals 114a-114n can each have a unique address and can contain a plurality of endpoints (e.g., 16 endpoints). Host 122 can send data to a specific endpoint in a peripheral by including a device address and endpoint number in a setup packet.

While device 100 sends and receives data on a series of endpoints, data transfer is through pipes. A "pipe" is a logical connection between host 122 and one or more endpoints in peripherals 114a-114n. Each pipe can also have a set of parameters, including but not limited to how much bandwidth is allocated to the pipe, what transfer type is used by the pipe (e.g., Control, Bulk, Isochronous, Interrupt), the direction of data flow through the pipe and the maximum packet or buffer size handled by the pipe.

A USB transaction can include a variety of packet types. The USB 2.0 Specification defines a token packet (e.g., a header with information describing the transaction), an optional data packet (e.g., containing a data payload), and a status or handshake packet used to acknowledge transactions and to provide a means of error correction. The token packet can be generated by USB host 122 and includes information that describes what is to follow in the transaction, whether the data transaction will be a read or write, the address of USB device 100 and the address of the designated endpoint in USB device 100. The next packet transferred in the USB transaction can be a data packet carrying a payload. The data packet can be followed by a status or handshake packet for reporting if a data packet or a token packet was transmitted or received successfully by USB device 100, or if the data transfer is stalled because USB device 100 is not available to accept data.

There can be three types of token packets in a USB transaction: IN, OUT and SETUP. The IN token packet informs device 100 that host 122 is requesting to read information. The OUT token packet informs device 100 that host 122 is requesting to send information. The SETUP token packet can be used to begin control type transfers.

In USB 2.0 Specification, there are two types of data packets defined: DATA0 and DATA1. Data can be sent in multiples of bytes. The maximum data packet size can be fixed at 8 bytes, 1023 bytes and 1024 bytes for low-speed, full-speed and high-speed devices, respectively.

In USB 2.0 Specification, there can be several types of "handshake" or status packets. An acknowledge or "ACK" handshake packet can acknowledge that a data packet has been successfully received by a USB device. A not acknowledged or "NAK" handshake or status packet can report that the USB device temporarily cannot send or receive data.

Conventional IN Transaction Using Multi-Packet Transfer

Figure 2:
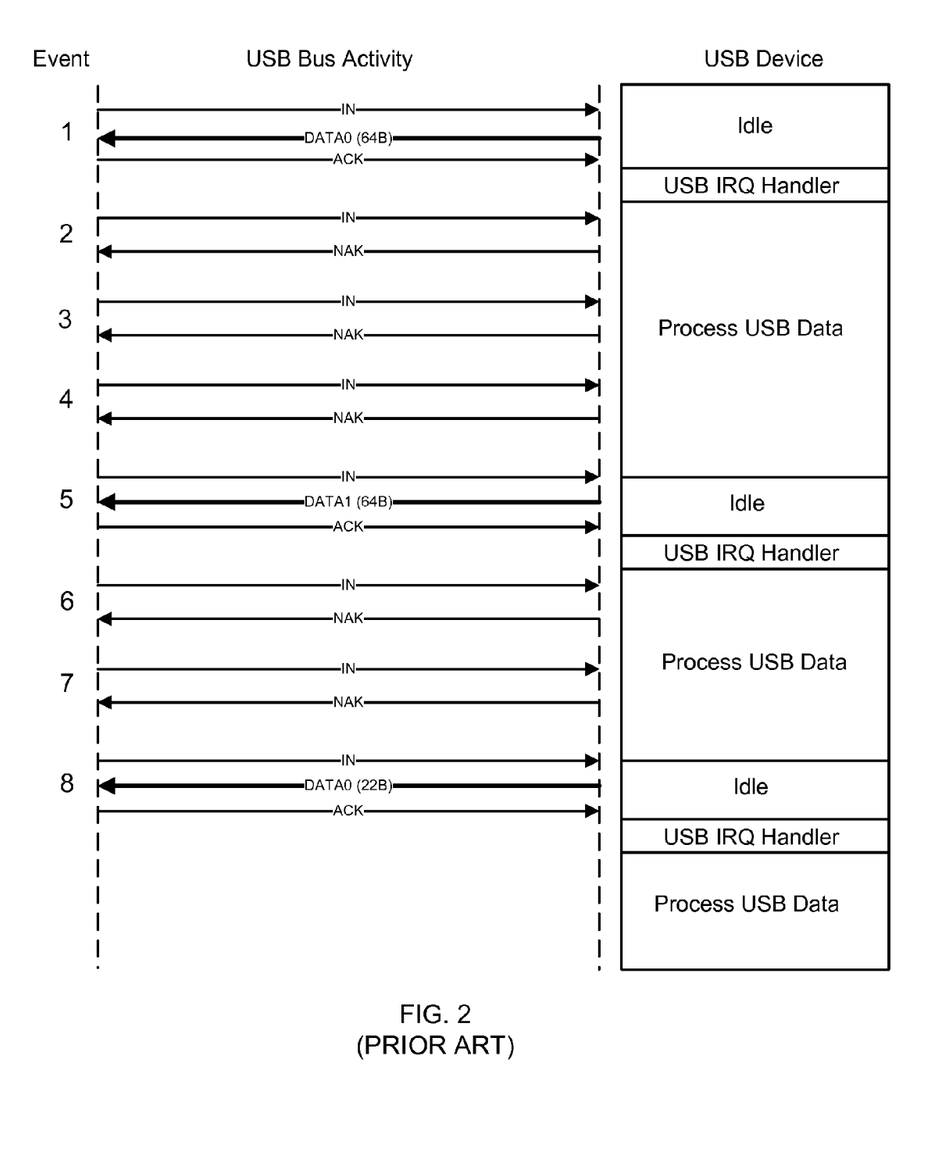
FIG. 2 is an event diagram illustrating a conventional IN transaction using multi-packet data transfer.

FIG. 2 is an event diagram illustrating a conventional IN transaction using multi-packet transfer. In this example, a USB host is requesting an IN transaction where 150 bytes (150B) of data is to be transferred from a USB device to the USB host. The maximum data payload size in this example is 64 bytes (64B). In FIGS. 2-5, the term "Idle" means CPU 104 is not handling USB requests. CPU 104 may be processing other data.

Referring to Event 1 in FIG. 2, while the USB device is idle (e.g., not processing USB data), the USB device receives an IN token packet from the USB host over the USB bus. In response, the USB device sends a first data packet (DATA0) containing a 64B data payload to the USB host. In response to receiving the first data packet, the USB host sends an ACK packet to the USB device, confirming that the first data packet was received without error. After the ACK packet is sent, a controller in the USB device (e.g., controller 116) issues an interrupt request to a CPU (e.g., CPU 104) in the USB device, requesting the CPU to prepare the next data packet for transfer. During the processing, more IN token packets can be received by the USB device as indicated by Events 2-4. For each of the Events 2-4, the USB device returns a NAK packet to the USB host indicating that the USB device temporarily cannot send a data packet.

When the CPU processing is finished and the CPU is idle, the next IN token packet can be received (Event 5), resulting in a second 64B data packet (DATA1) being sent to the USB host. Upon receipt of the second data packet, the USB host returns an ACK packet to the USB device, confirming that the second data packet was received by the USB host without error. After the ACK packet is sent, the controller in the USB device issues another interrupt request to CPU requesting the CPU to prepare the next packet. During this processing, more IN token packets can be received by the USB device as indicated by Events 6 and 7 in FIG. 2. For each of the Events 6 and 7, the USB device returns a NAK packet to the USB host indicating that the USB device temporarily cannot send a data packet.

When the CPU processing is finished and the CPU is idle, the next IN token packet can be received (Event 8), resulting in a third 22B data packet (DATA0) being sent to the USB host. Upon receipt of the third data packet, the USB host returns an ACK packet to the USB device, confirming that the third data packet was received by the USB host without error. After the ACK packet is sent, the controller in the USB device can issue another interrupt request to the CPU to start parsing and processing the data received in the data packets, such as transferring the data to peripherals (e.g., peripherals 114a-114n).

As shown in FIG. 2, a conventional IN transaction can result in multiple software interventions by the CPU to process USB data. Due to the maximum data packet size of 64B, a total of three data packets are needed to transfer 150B of data to the USB host: two 64B packets and one 22B packet. And each of these transfers require multiple software interventions to process the USB data.

IN Transaction Using Autonomous Multi-Packet Transfer

Figure 3:
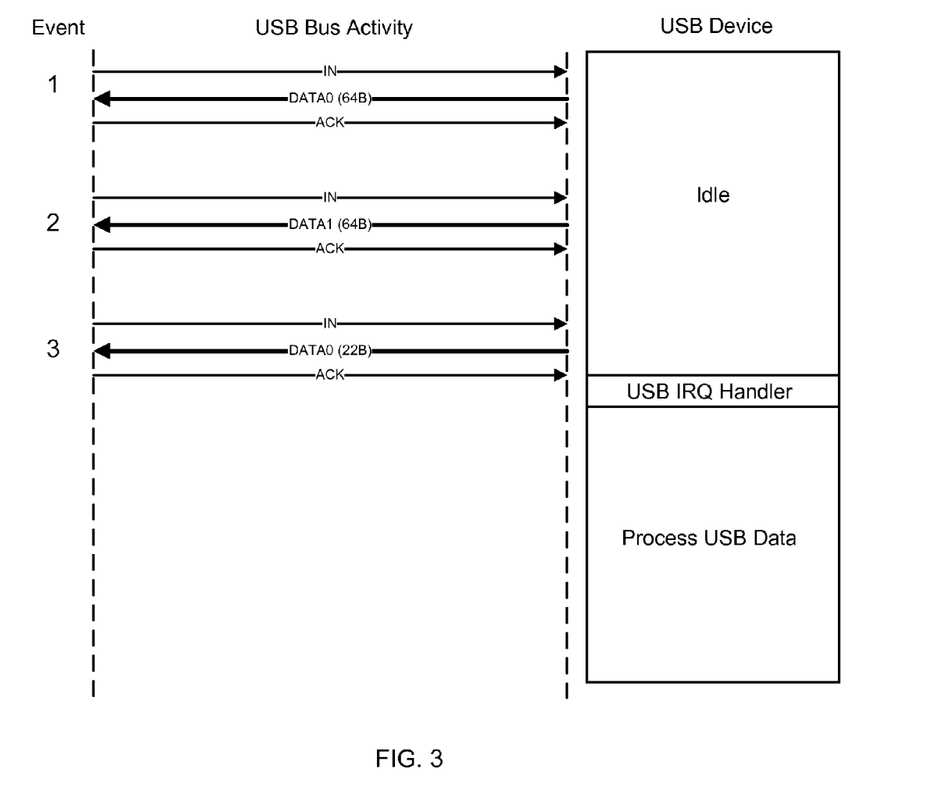
FIG. 3 is an event diagram illustrating an exemplary IN transaction using autonomous multi-packet data transfer.

FIG. 3 is an event diagram illustrating an exemplary IN transaction using autonomous multi-packet transfer. In this example, the same type of transaction is performed as was described in reference to FIG. 2.

Referring to Event 1 in FIG. 3, while the USB device is idle (e.g., not processing USB data), the USB device receives an IN token packet from the USB host over the USB bus. In response to the IN token packet, the USB device sends a first 64B data packet (DATA0) to the USB host. In response to receiving the first data packet, the USB host can send an ACK packet to the USB device, confirming that the first data packet was received by the USB host without error.

Unlike the conventional transaction illustrated in FIG. 2, rather than processing the USB data immediately, the USB device remains receptive to receive and respond to a second IN token packet. In response to the second IN token packet, a second 64B data packet (DATA1) is sent to the USB host. In response to receiving the second data packet, the USB host can send an ACK packet to the USB device, confirming that the second data packet was received by the USB host without error.

Next the USB device receives a third IN token packet and responds with a third 22B data packet (DATA0) and the USB host sends an ACK packet to the USB device, confirming that the third data packet was received by the USB host without error. In response to receiving the third data packet, the USB device optionally generates an interrupt signal to the CPU in the USB device to initiate processing of USB data by the CPU.

By comparing the event diagrams of FIGS. 2 and 3, it can be observed that the autonomous multi-packet transfer shown in FIG. 3 has eliminated software interventions after each data packet transfer (less CPU interrupts). However, upon completion of the data transfer, an interrupt can optionally be generated. There are no interrupts generated during the data transfer. Additionally, since the USB device is available for receiving IN token packets, the NAK status packets generated in the conventional transaction generated by the USB device have been avoided.

Referring again to FIGS. 1 and 3, the autonomous multi-packet transfer will now be described in further detail. For IN transactions, CPU 104 will provide controller 116 with the amount of data to be transferred and a start address for the data to be transferred. In this example, the data can be stored in memory 106. Each time an IN token packet is received from host 122, controller 116 sends a maximum length data packet to USB host 122 if the remaining number of data bytes transferred is equal to or greater than the maximum data packet size. After each data packet has been transferred, controller 116 stores the number of bytes of data transferred and updates a toggle status for non-isochronous endpoints. In some implementations, the number of bytes transferred can be stored as a byte count in a register in controller 116 or memory 106 (e.g., register 117). The register can be written to zero when setting up a new transfer.

If the remaining data bytes to be sent is less than the maximum packet size, the remaining data bytes can be sent in a "last" data packet, and the completion of the transfer is indicated after the last data packet has been sent. Controller 116 can optionally generate an interrupt signal for CPU 104 when the last packet has been sent. If the number of data bytes to be sent is an integral multiple of the maximum data packet size, controller 116 can optionally send a zero-length data packet as the last data packet to indicate completion of the data transfer. If the last data packet includes fewer bytes than the maximum data packet size, the payload of the data packet can include padding (e.g., padding with 0s).

In some implantations, controller 116 can send a control signal to memory arbiter 112 to gain access to the IN endpoint buffers (e.g., FIFO buffers) in memory 106 that are used in the USB transaction. In response to the control signal, controller 116 can directly access memory 106 and place the data on peripheral bus 120. Controller 116 can then send the data in a packet to USB host 122 through USB transceiver 118.

By contrast, in the conventional transfer shown in FIG. 2, after each data packet transfer, CPU 104 accesses memory 106 to read data for the next data packet. These software interventions performed after each data packet transfer can slow down the data transfer process, resulting in poor bus utilization.

Conventional OUT Transaction Using Multi-Packet Transfer

Figure 4:
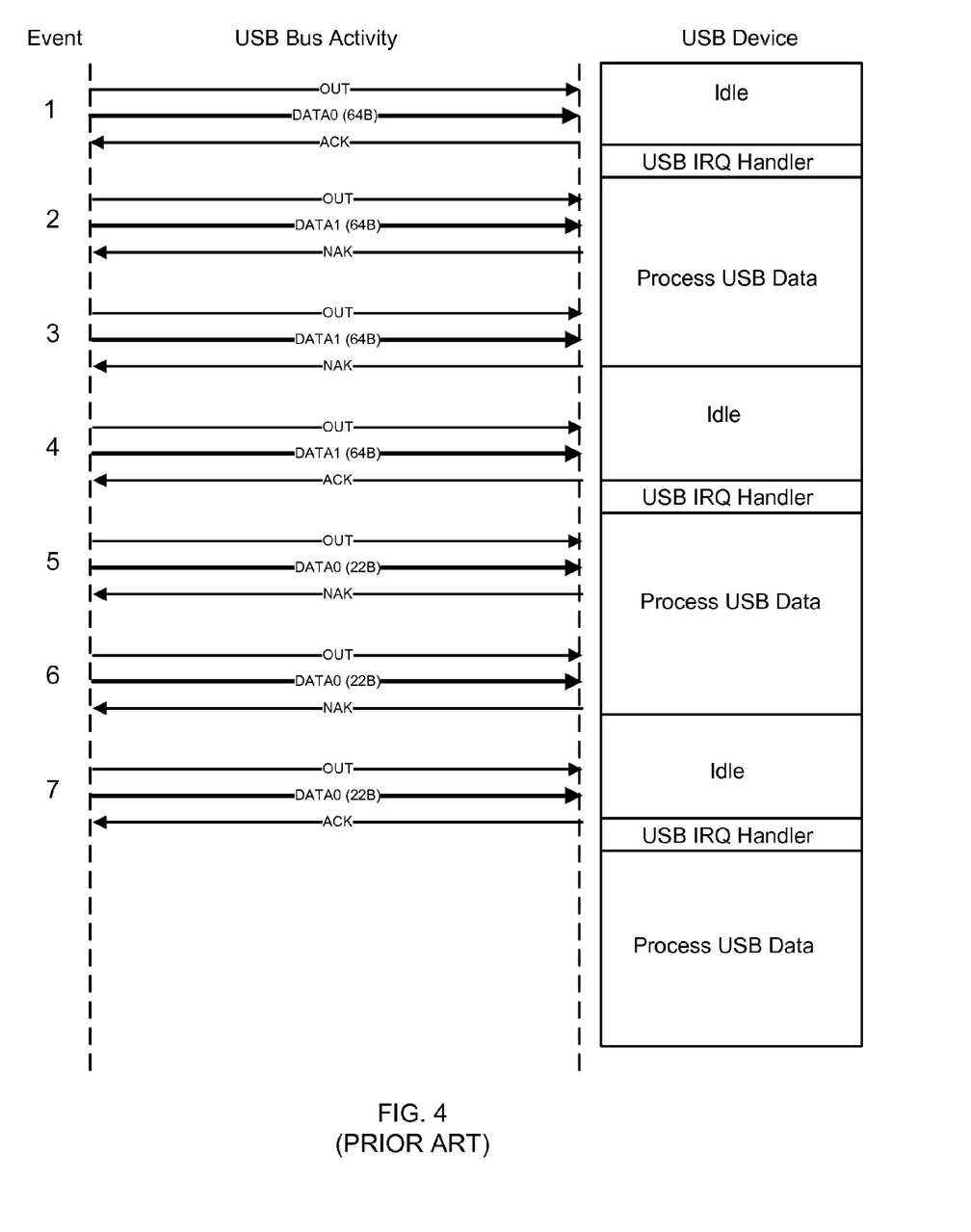
FIG. 4 is an event diagram illustrating a conventional OUT transaction using multi-packet data transfer.

FIG. 4 is an event diagram illustrating a conventional OUT transaction using multi-packet transfer. In this example, the USB host is requesting an OUT transaction where 150B of data is to be transferred from the USB host to a USB device. The maximum data packet size in this example is 64B.

Referring to Event 1 in FIG. 4, while the USB device is idle (e.g., not processing USB data), the USB device receives an OUT token packet from the USB host over the USB bus. In response to the OUT token packet, the USB device receives a first 64B data packet (DATA0) from the USB host. In response to receiving the first data packet, the USB device sends an ACK packet to the USB host, confirming that the first data packet was received by the USB device without error. After the ACK packet is sent, a controller in the USB device (e.g., controller 116) issues an interrupt request to a CPU (e.g., CPU 104) in the USB device to start parsing and processing data in the first data packet. During this processing, several other OUT token packets can be received by the USB device as indicated by Events 2 and 3 in FIG. 4. For each of the Events 2 and 3, the USB device can return a NAK packet to the USB host indicating that the USB device temporarily cannot receive the second data packet.

When the processing of the first data packet is finished on the USB device, the next OUT token packet can be received (Event 3), resulting in a second 64B data packet (DATA1) being sent from the USB host. Upon receipt of the second data packet, the USB device returns an ACK packet to the USB host, confirming that the second data packet was received without error. After the ACK packet is sent, the controller in the USB device issues another interrupt request to signal the CPU in the USB device to start parsing and processing data in the second data packet. During this processing, several more OUT token packets can be received by the USB device as indicated by Events 5 and 6 in FIG. 4. For each of the Events 5 and 6, the USB device can returns a NAK packet to the USB host indicating that the USB device temporarily cannot receive the second data packet.

When the CPU processing is finished on the USB device, the next IN token packet can be received (Event 8), resulting in a third data 22B packet (DATA0) being sent to the USB device. Upon receipt of the third data packet, the USB device can return an ACK packet to the USB host, confirming that the third data packet was received by the USB device without error. After the ACK packet is sent, the controller in the USB device can issues another interrupt request to signal the CPU in the USB device to start parsing and processing data in the third data packet.

As shown in FIG. 4, a conventional OUT transaction can result in multiple software interventions performed by the CPU to process USB data. Due to the maximum data payload size of 64 bytes, a total of three data packets were needed to transfer the requested 150 bytes data to the USB host: two 64 byte data packets and one 22 byte data packet. And each of these transfers require that software interventions be performed by the CPU to process USB data.

OUT Transaction Using Autonomous Multi-Packet Transfer

Figure 5:
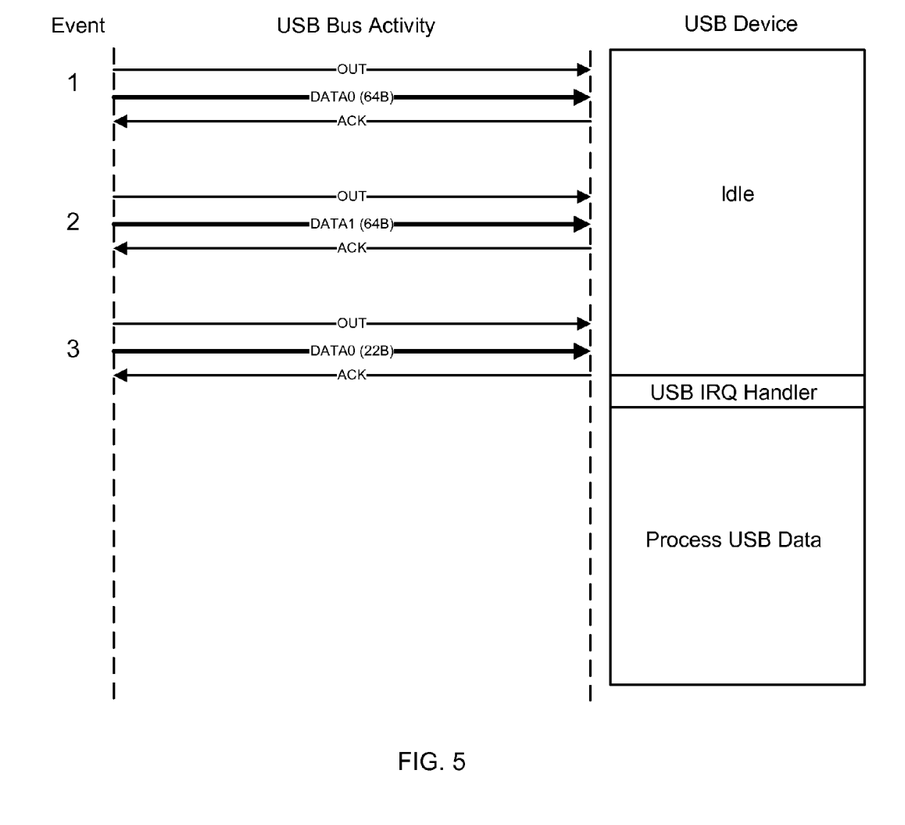
FIG. 5 is an event diagram illustrating an exemplary OUT transaction using autonomous multi-packet data transfer.

FIG. 5 is an event diagram illustrating an exemplary OUT transaction using autonomous multi-packet transfer. In this example, the same transaction is performed as was described in reference to FIG. 2.

Referring to Event 1 in FIG. 5, while the USB device is idle (e.g., not processing USB data), the USB device receives an OUT token packet from the USB host over the USB bus. In response to the OUT token packet, the USB host sends a first data packet (DATA0) containing a 64B data payload to the USB device. In response to receiving the first data packet, the USB device can send an ACK packet to the USB host, confirming that the first data packet was received by the USB device without error.

Unlike the conventional USB transaction shown in FIG. 4, rather than processing the USB data after each data packet transfer, the USB device remains receptive to additional OUT token packets. In response to the second OUT token packet, a second 64B data packet (DATA1) is sent to the USB device. In response to receiving the second data packet, the USB device can send an ACK packet to the USB host, confirming that the second data packet was received by the USB device without error.

Next the USB device receives a third OUT token packet and responds with a third 22B data packet (DATA0) and the USB device sends an ACK packet to the USB host, confirming that the third data packet was received by the USB device without error. In response to receiving the third data packet, the USB device can optionally generate an interrupt request to the CPU to initiate processing of the USB data packets.

By comparing the event diagrams of FIGS. 4 and 5, it can be observed that the autonomous multi-packet transfer shown in FIG. 5 has eliminated a software intervention after each data transfer (less CPU interrupts). However, upon completion of the data transfer, an interrupt can optionally be generated. There are no interrupts generated during the data transfer. Additionally, since the USB device is available for receiving OUT token packets, the NAK status packets generated in the conventional transaction have been avoided.

Referring to FIGS. 4 and 5, the autonomous multi-packet transfer will now be described in more detail. For OUT endpoints in USB device 100, CPU 104 can provide USB device 100 with a maximum amount of data that can be accepted and a start address for an endpoint buffer in memory 106 for storing the received data. Each time an OUT token packet is received from USB host 122, the data from data packet following the OUT token packet and the number of bytes received can be stored. A toggle status can be updated for non-isochronous endpoints. If the received data packet is less than the maximum data packet size, or the total number of data bytes received matches the maximum amount of data that can be accepted by the endpoint, completion of the transfer to the endpoint can be indicated. For example, the completion of the transfer can be indicated by USB device controller 116 optionally generating an interrupt to CPU 104 when the last data packet has been received by the endpoint. The interrupt can signal the CPU 104 to process the data received in the endpoint buffer.

Example Processes for Autonomous Multi-Packet Transfer

Figure 6:
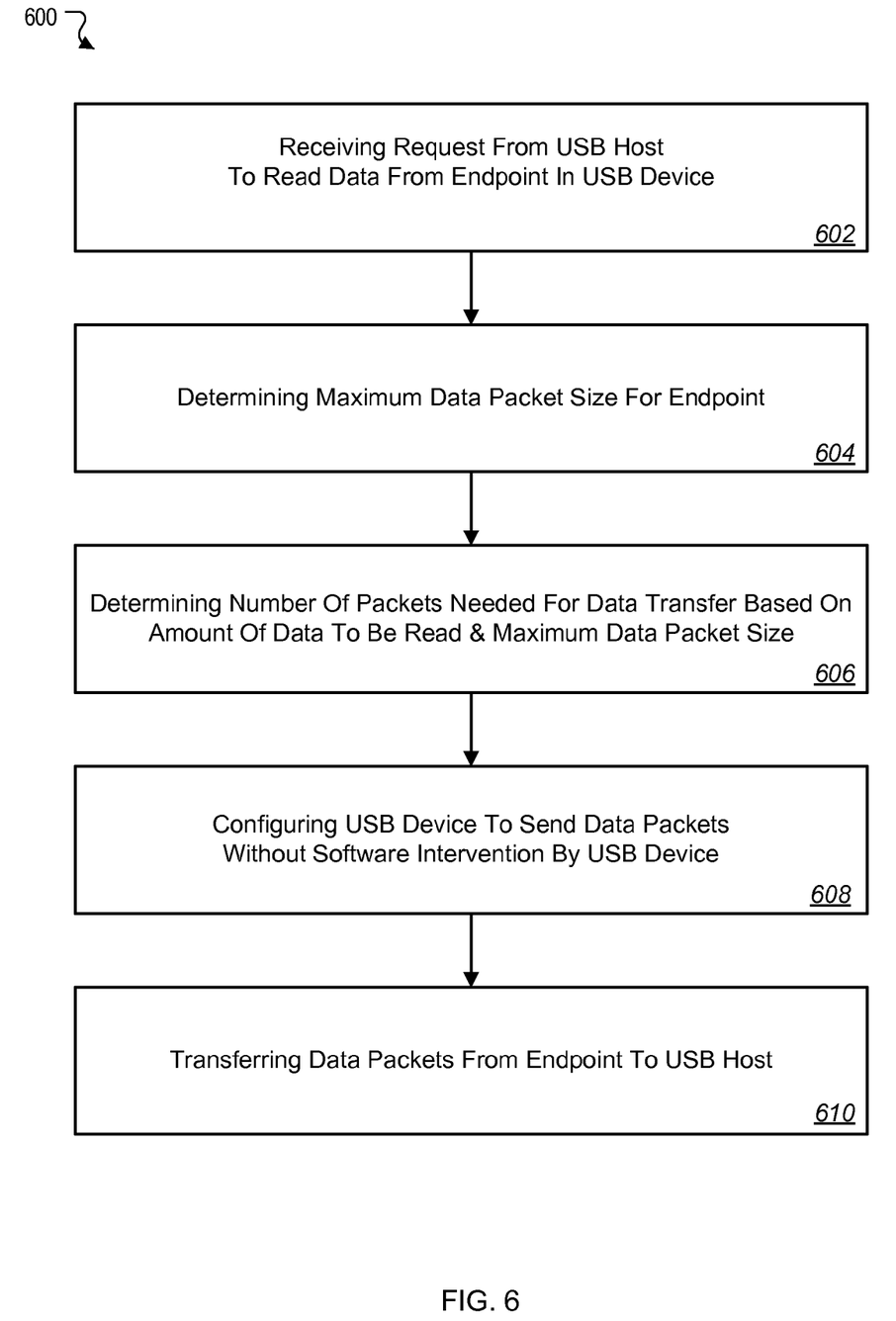
FIG. 6 is a flow diagram of an exemplary process for an IN transaction using autonomous multi-packet data transfer.

FIG. 6 is a flow diagram of an exemplary process 600 for an IN transaction using autonomous multi-packet data transfer. In some implementations, process 600 can begin when a USB device receives a request from a USB host to read data from an endpoint in the USB device (602). The request can be, for example, an IN token packet as defined in USB 2.0 Specification. An example USB device can be an integrated circuit device for providing a USB interface. An example USB host can be a personal computer.

Upon receiving the request, the USB device can determine a maximum data packet size (604). A maximum data packet size can be any fixed size, such as 8 bytes, 64 bytes, 1023 bytes, 1024 bytes depending on the desired speed of the data transfer. The USB device can also determine a number of packets needed for data transfer based on the amount of data to be read and the maximum data packet size (606). If more than one packet is needed, then the USB device can be configured for an autonomous multi-packet data transfer without using software intervention by the USB device (608). The configuration can be initiated by a USB controller in the USB device. The USB device transfers data from the endpoint buffer to the USB host (610).

Referring to FIG. 1, USB device controller 116 can send a control signal to a memory arbiter 112 to allow controller 116 to have direct access to memory 106 storing the endpoint buffer containing the data to be read without interrupting CPU 104. In some implementations, CPU 104 will provide controller 116 with the amount of data to be transferred and a start address for the data to be transferred. In this example, the start address can be the start address of the endpoint buffer in memory 106 for storing the data to be transferred. Each time an IN token packet is received from USB host 122, controller 116 sends a maximum length data packet to USB host 122 if the remaining number of data bytes transferred is equal to or greater than the maximum data packet size. After each data packet has been transferred, controller 116 stores the number of bytes of data transferred (e.g., stored in register 117) and updates a toggle status for non-isochronous endpoints. If the remaining data bytes to be sent is less than the maximum data packet size, the remaining data bytes can be sent in a "last" data packet, and the completion of the transfer can be indicated after the last data packet has been sent. For example, the completion of transfer can be indicated by controller 116 optionally generating an interrupt for CPU 104 when the last packet has been sent.

Figure 7:
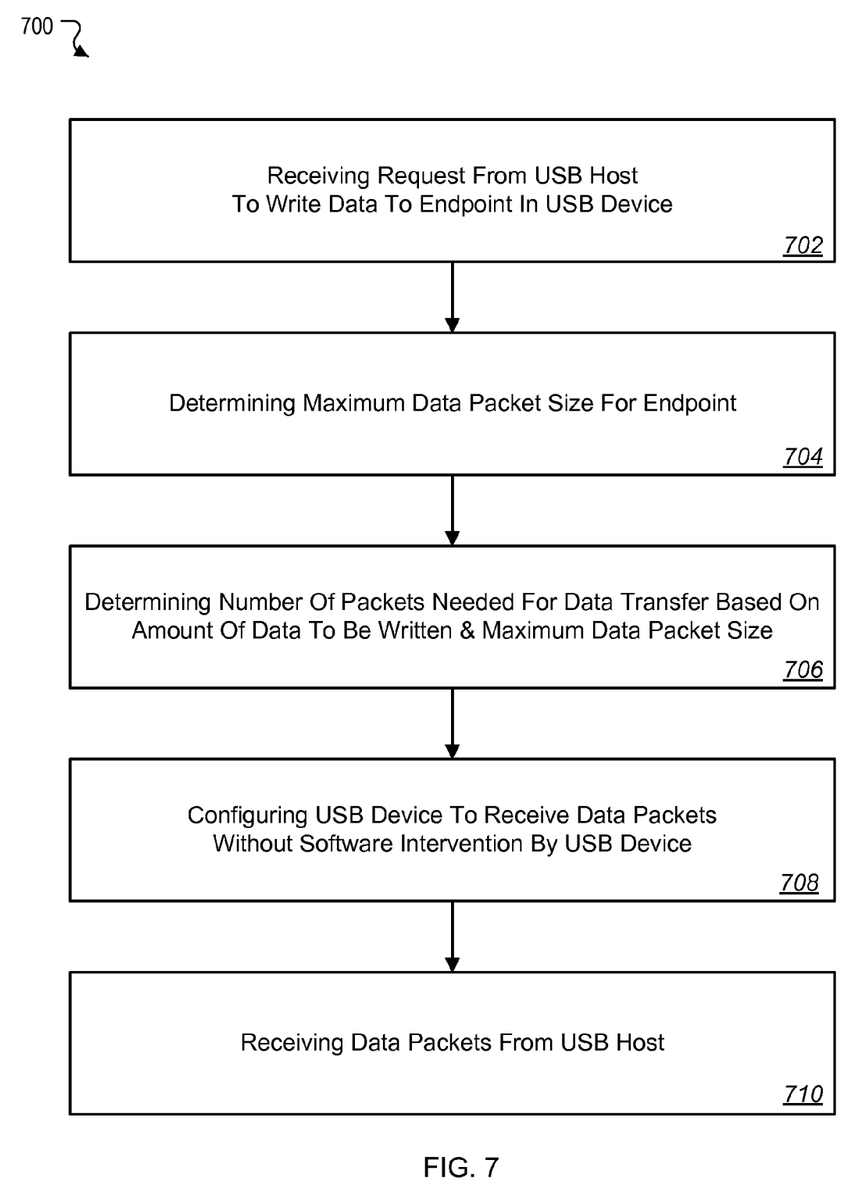
FIG. 7 is a flow diagram of an exemplary process for an OUT transaction using autonomous multi-packet data transfer.

FIG. 7 is a flow diagram of an exemplary process 700 for an OUT transaction. In some implementations, process 700 can begin when a USB device receives a request from a USB host to write data to an endpoint in the USB device (702). The request can be, for example, an OUT token packet as defined in USB 2.0 Specification.

Upon receiving the request, the USB device can determine a maximum data packet size (704). A maximum data packet size can be any fixed size, such as 8 bytes, 64 bytes, 1023 bytes, 1024 bytes depending on the desired speed of the data transfer. The USB device can also determine a number of packets needed for data transfer based on the amount of data to be written to the endpoint and the maximum data packet size (706). If more than one packet is needed, then the USB device can be configured to receive data packets without using software intervention by the CPU in the USB device (708). The configuration can be initiated by a USB device controller in the USB device (e.g., USB device controller 116). The USB device transfers data from the USB host to the appropriate endpoint buffer (710).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A method of multi-packet data transfer on a Universal Serial Bus (USB), comprising:
receiving a setup request from a USB host to read data from an endpoint in a USB device;
determining a maximum data packet size for the endpoint, wherein the maximum data packet size is less than an amount of data to be read from the endpoint;

determining a number of packets needed for the data transfer based on the amount of data to be read by the USB host and the maximum data packet size;

receiving a first token packet from the USB host, wherein the first token packet requests a first data packet;

responsive to the first token packet, transferring the first data packet to the USB host using a USB device controller, where the transferring occurs without interrupting a Central Processing Unit (CPU), the transferring comprising:

providing a control signal to a memory arbiter to access the data to be read from a buffer of the endpoint;

accessing the data based on a start address provided by the CPU; and providing the first data packet based on the accessed data;

during processing of the setup request by the USB device controller, receiving and accepting a second token packet from the USB host requesting a second data packet transfer, wherein receiving the second token packet occurs without interrupting the CPU and prevents transmission of NAK packets; and after transferring the number of packets needed for the data transfer, generating an interrupt for the CPU.

2. The method of claim 1, where transferring the first data packet further comprises:

determining that a remaining number of data bytes to be read from the endpoint is equal to or greater than the maximum data packet size; and transmitting the first data packet to the USB host containing a number of data bytes equal to the maximum data packet size.

3. The method of claim 1, where transferring the first data packet further comprises:

determining that a remaining number of data bytes to be read from the endpoint is less than the maximum data packet size; and in response to the second token packet, transmitting a second data packet to the USB host containing the remaining number of data bytes to be transferred to the USB host.

4. The method of claim 1, comprising:

determining that the number of data bytes to be read from the endpoint is an integral multiple of the maximum data packet size; and transmitting a second data packet containing zero bytes of data.

5. The method of claim 1, comprising:

updating a toggle status for one or more non-isochronous endpoints.

6. A method of multi-packet data transfer on a Universal Serial Bus (USB), comprising:

receiving a setup request from a USB host to write data to an endpoint in a USB device;

determining a maximum data packet size for the endpoint, wherein the maximum data packet size is less than an amount of data to be written to the endpoint;

determining a number of packets needed for the data transfer based on the amount of data to be written to the USB device and the maximum data packet size;

receiving a first token packet from the USB host, wherein the first token packet requests to transmit a first data packet to the USB device;

responsive to the first token packet, receiving the first data packet at the USB device using a USB device controller, where the receiving occurs without interrupting a Central Processing Unit (CPU), the receiving comprising:

providing a control signal to a memory arbiter to write the data at a buffer of the endpoint; and writing the data based on a start address provided by the CPU;

sending, to the USB host, an acknowledgement packet that the first data packet was received without error;

during processing of the setup request by the USB device controller, receiving and accepting a second token packet from the USB host requesting a second data packet transfer, wherein receiving the second token packet occurs without interrupting the CPU and prevents transmission of NAK packets; and after receiving the number of packets needed for the data transfer, generating an interrupt for the CPU.

7. The method of claim 6, where receiving the first data packet comprises:

determining that a remaining number of data bytes to be written to the endpoint is equal to or greater than the maximum data packet size; and receiving the first data packet from the USB host containing a number of data bytes equal to the maximum data packet size.

8. The method of claim 6, where receiving the first data packet further comprises:

determining that a remaining number of data bytes to be written to the endpoint is less than the maximum data packet size; and in response to the second token packet, receiving a second data packet from the USB host containing the remaining number of data bytes to be written to the endpoint.

9. The method of claim 6, comprising:

determining that the number of data bytes to be written to the endpoint is an integral multiple of the maximum data packet size; and receiving a second data packet from the USB host containing zero bytes of data.

10. The method of claim 6, comprising:

updating a toggle status for one or more non-isochronous endpoints.

11. A Universal Serial Bus (USB) device, comprising:

an interface configured for receiving a setup request from a USB host to read data from an endpoint in the USB device;

a USB device controller coupled to the interface and configured to perform operations comprising:

determining a maximum data packet size for the endpoint;

determining a number of packets needed for the data transfer based on the amount of data to be read by the USB host and the maximum data packet size;

receiving a first token packet from the USB host, wherein the first token packet requests a first data packet;

responsive to the first token packet, transferring the first data packet to the USB host using the USB device controller, where the transferring occurs without interrupting a Central Processing Unit (CPU), the transferring comprising:

providing a control signal to a memory arbiter to access the data to be read from a buffer of the endpoint;

accessing the data based on a start address provided by the CPU; and providing the first data packet based on the accessed data;

during processing of the setup request by the USB device controller, receiving and accepting a second token packet from the USB host requesting a second data packet transfer, wherein receiving the second token packet occurs without interrupting the CPU and prevents transmission of NAK packets; and after transferring the number of packets needed for the data transfer, generating an interrupt for the CPU.

12. The device of claim 11, where the USB device controller is further configured to perform operations comprising:

determining that a remaining number of data bytes to be read from the endpoint is equal to or greater than the maximum data packet size; and transmitting the first data packet to the USB host containing a number of data bytes equal to the maximum data packet size.

13. The device of claim 11, where the USB device controller is further configured to perform operations comprising:

determining that a remaining number of data bytes to be read from the endpoint is less than the maximum data packet size; and in response to the second token packet, transmitting a second data packet to the USB host containing the remaining number of data bytes to be transferred to the USB host.

14. The device of claim 11, where the controller is further configured to perform operations comprising:

determining that the number of data bytes to be read from the endpoint is an integral multiple of the maximum data packet size; and transmitting a second data packet containing zero bytes of data.

15. The device of claim 11, where the controller is further configured to perform an operation comprising:

updating a toggle status for one or more non-isochronous endpoints.

16. A Universal Serial Bus (USB) device, comprising:

an interface configured for receiving a setup request from a USB host to write data to an endpoint in the USB device;

a USB device controller coupled to the interface and configured to perform operations comprising:

determining a maximum data packet size for the endpoint, wherein the maximum data packet size is less than an amount of data to be written to the endpoint;

determining a number of packets needed for the data transfer based on the amount of data to be written to the USB device and the maximum data packet size;

receiving a first token packet from the USB host, wherein the first token packet requests to transmit a first data packet to the USB device;

responsive to the first token packet, receiving the first data packet at the USB device using a USB device controller, where the receiving occurs without interrupting a Central Processing Unit (CPU), the receiving comprising:

providing a control signal to a memory arbiter to write the data at a buffer of the endpoint; and writing the data based on a start address provided by the CPU;

sending, to the USB host, an acknowledgement packet that the first data packet was received without error;

during processing of the setup request by the USB device controller, receiving and accepting a second token packet from the USB host requesting a second data packet transfer, wherein receiving the second token packet occurs without interrupting the CPU and prevents transmission of NAK packets; and after receiving the number of packets needed for the data transfer, generating an interrupt for the CPU.

17. The device of claim 16, where the USB device controller is further configured for performing operations comprising:

determining that a remaining number of data bytes to be written to the endpoint is equal to or greater than the maximum data packet size; and receiving the first data packet from the USB host containing a number of data bytes equal to the maximum data packet size.

18. The device of claim 16, where the USB device controller is further configured to perform operations comprising:

determining that a remaining number of data bytes to be written to the endpoint is less than the maximum data packet size; and in response to the second token packet, receiving a second data packet from the USB host containing the remaining number of data bytes to be written to the endpoint.

19. The device of claim 16, where the USB device controller is further configured to perform operations comprising:

determining that the number of data bytes to be written to the endpoint is an integral multiple of the maximum data packet size; and receiving a second data packet from the USB host containing zero bytes of data.

20. The device of claim 16, where the USB device controller is further configured to perform operations, comprising:

updating a toggle status for one or more non-isochronous endpoints.

* * * * *